March 19, 1963 L. H. BISHOP 3,082,354
SPEED SENSING DEVICE USING TWO-PHASE ALTERNATOR
Filed March 2, 1959
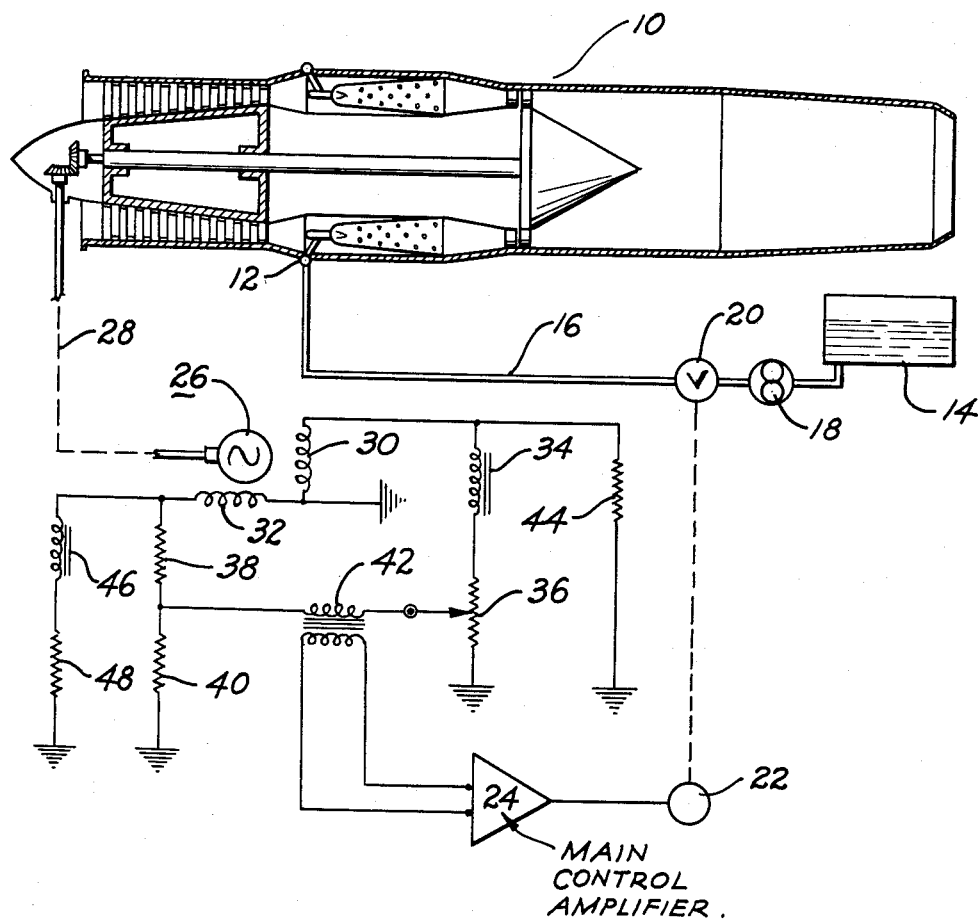
INVENTOR.
LEON H. BISHOP.
BY
ATTORNEY.

United States Patent Office 3,082,354
Patented Mar. 19, 1963

3,082,354
SPEED SENSING DEVICE USING TWO-PHASE ALTERNATOR
Leon H. Bishop, South Bend, Ind., assignor to The Bendix Corporation, a corporation of Delaware
Filed Mar. 2, 1959, Ser. No. 796,480
9 Claims. (Cl. 317—5)

The present invention relates to speed governing devices and more particularly to an electrical system for producing a speed error signal usable by an electrically actuated speed controller.

Many designs of electrical speed governors have been proposed and used but most have been found to have certain disadvantages where high standards of accuracy are required, as in the field of gas turbine engine controls. The direct current tachometer has lost favor with designers because its voltage output vs speed characteristic is not satisfactorily linear or stable. The alternating current tachometer produces a voltage output in which both frequency and magnitude are proportional to speed. Production of a speed error signal normally has required converting the output of the alternating current tachometer into two smooth direct current voltages, one of which varies in ampliude with speed and the other which is constant for use as a reference. This, of course, involves rectifiers and filtering means. When an error signal is produced by this means, it is a direct current signal which requires a modulating device or chopper before it can be amplified in a conventional alternating current amplifier. Efforts to compare alternating current voltages have typically involved reactance elements to achieve a voltage regulation for the reference signal, and then problems have arisen as to phasing and impedance balances in the signal and reference circuits. It is, therefore an object of the present invention to provide means for producing an accurate alternating current speed error signal from an alternating current source using a minimum number of components.

It is another object of the present invention to provide means for producing an accurate alternating current speed error signal from an alternating current source without the necessity for using rectifiers, filters or choppers.

It is a further object of the present invention to provide means for producing an accurate alternating current speed error signal from an alternating current source in which reactance means is used to provide a reference signal in phase with the speed signal.

It is a further object to provide means which will accomplish the above objects and in which accuracy is assured through the use of means for balancing impedances in both the speed and speed error signal producing circuits.

Other objects and advantages will appear from the following specification taken in connection with the accompanying drawing in which the single FIGURE shows a schematic diagram of a speed error signal producing circuit incorporating the teachings of my invention in association with means for controlling the speed of a gas turbine engine.

Referring to the drawing, a gas turbine engine is shown generally at numeral 10 having a manifold 12 which is supplied with fuel from a source 14 through a conduit 16. A pump 18 supplies fuel from the source 14 to a metering valve 20 which controls the amount of fuel supplied to the manifold 12. Valve 20 is positioned through the action of a motor 22 which, in turn, is controlled by an electrical main fuel control amplifier 24 which may be similar to that shown in copending application Serial No. 402,976 (common assignee). It is the function of my speed governing system to supply the main control amplifier 24 with a speed error signal.

A tachometer 26 is directly driven through a shaft 28 by the engine 10 at a speed directly proportional to the speed of said engine. The tachometer is a two-phase type having a first phase winding 30 and a second phase winding 32, in both of which are generated identical voltages varying directly in magnitude and frequency with the speed of the engine. These voltages differ only in that the voltage produced in winding 30 leads that of winding 32 by approximately ninety electrical degrees. The voltage developed in winding 30 is impressed across an impedance network consisting of an inductive reactor 34 and a potentiometer 36 and the output from winding 32 is impressed across a voltage dividing circuit consisting of a pair of resistors 38 and 40. The reactance of inductor member 34 is much greater than the resistance of potentiometer 36 and the over-all effect of this arrangement is that the current in this branch lags the voltage by approximately 90° and is effectively in phase with the current across resistors 38 and 40. Inasmuch as the impedance of this branch increases almost directly with frequency, the current across potentiometer 36 at all speeds in the operating range of the engine is substantially constant. A constant voltage is therefore obtainable across the potentiometer 36 which may be calibrated for use as a speed reference. The difference in the voltages measured across resistor 40 and the selected portion of potentiometer 36 appears as an alternating current voltage of an amplitude proportional to the magnitude of the difference and a phase relationship depending upon the direction of the departure of the speed signal from the reference signal. This signal is impressed on the primary winding of an output transformer 42 and the secondary winding of this transformer is connected to the main control amplifier 24 where it is amplified and used to control the direction of rotation of motor 22 and hence the opening or closing of the valve 20.

To provide the utmost accuracy, it has been found desirable to provide means for balancing the loads on the two phases at all frequencies. This is accomplished by connecting a resistor 44 in parallel with potentiometer 36 and inductor 34 and by connecting an inductor 46 and resistor 48 in parallel with the resistors 38 and 40. The impedance characteristic of the branch containing inductor 46 and resistor 48 is substantially identical to that of the branch containing inductor 34 and potentiometer 36 and the impedance characteristic of the branch containing resistor 44 is essentially the same as that containing resistors 38 and 40 so that each impedance branch is effectively shunted with an impedance which is the exact equivalent of the other branch.

In considering the operation of the system heretofore described, it would be useful to first consider the engine 10 as operating at a steady requested speed. Under these conditions, the valve 20 assumes a position which will permit just enough fuel to flow to the engine to maintain the selected speed. This speed is reflected in the rotational speed of the tachometer 26 and a certain specific frequency and voltage output is generated across the two phases 30 and 32. The voltage generated in the winding 32 appears as an alternating current voltage across resistors 38 and 40 which is directly proportional to speed. The voltage generated in winding 30 leads the aforementioned voltage by ninety electrical degrees and the resulting current due to the action of the inductor 34, effectively lags the voltage by approximately 90°. This causes a voltage drop across resistor 36 which is in phase with the voltage across resistor 40 and, inasmuch as the engine is operating at a steady requested speed, there is no error signal developed on the primary winding of output transformer 42, thus no signal into the main control amplifier to change the position of motor 22 and the valve 20. Let us assume now that the operator of the engine 10 requests greater speed by changing the position of the slider on the potentiometer 36. This will result in a voltage of the same frequency but greater magnitude than that developed across resistor 40 to be selected from this potentiometer and results in the developing of an alternating current signal of a particular phase and magnitude proportional to the amount of speed error to be developed in the primary winding of transformer 42. This same signal is induced in the secondary winding of the output transformer multiplied by whatever turns ratio is desired, and then is supplied to the main control amplifier 24. Should the engine tend to overspeed the signal which is developed across the resistor 40 will be greater in magnitude than that selected from potentiometer 36, and an alternating current signal of the opposite phase relationship will be developed in the primary winding of the output transformer 42.

While only one embodiment has been shown and described herein, modification may be made to suit the requirements of any given application without departing from the scope of the present invention.

I claim:

1. A system for controlling the speed of a rotating member comprising an electrically controlled speed adjusting means for said member, a tachometer driven by said member having a first phase winding and a second phase winding, said windings having produced thereacross substantially identical output voltages varying in frequency and magnitude with the speed of said member and the voltage output of said first phase leading that of said second phase by approximately ninety electrical degrees, an impedance network connected between said first phase winding and ground including an inductor and a potentiometer connected in series wherein the reactance of said branch is substantially greater than the resistance such that the voltage across said potentiometer is substantially constant over the operating speed range of said rotating member and lags the voltage produced across said first phase winding by approximately ninety electrical degrees and a resistance device connected in parallel with said inductor and said potentiometer, a second impedance network connected between said second phase winding and ground including a resistance voltage divider circuit and an inductor and a resistor connected in parallel with said voltage divider circuit, and an output transformer having its primary winding connected between said voltage divider circuit and the slider of said potentiometer, and its secondary winding connected to said speed adjusting means.

2. A system for controlling the speed of a rotating member comprising an electrically controlled speed adjusting means for said member, a tachometer driven by said member having a first phase winding and a second phase winding, said windings having produced thereacross substantially identical output voltages varying in frequency and magnitude with the speed of said member and the voltage output of said first phase leading that of said second phase by approximately ninety electrical degrees, an impedance network connected between said first phase winding and ground including an inductor and a potentiometer connected in series wherein the reactance of said branch is substantially greater than the resistance such that the voltage across said potentiometer is substantially constant over the operating speed range of said rotating member and lags the voltage produced across said first phase winding by approximately ninety electrical degrees, a second impedance network connected between said second phase winding and ground including a resistance voltage divider circuit, and an output transformer having its primary winding connected between said voltage divider circuit and the slider of said potentiometer, and its secondary winding connected to said speed adjusting means.

3. A system for controlling the speed of a rotating member comprising an electrically controlled speed adjusting means for said member, a tachometer driven by said member having a first phase winding and a second phase winding, said windings having produced thereacross substantially identical output voltages varying a frequency and magnitude with the speed of said member and the voltage output of said first phase leading that of said second phase by approximately ninety electrical degrees, a first impedance network connected between said first phase winding and ground including reactance means and resistance means wherein said means are of such value that the voltage across said resistance means is substantially constant over the operating speed range of said rotating member and lags the voltage produced by said first phase winding by approximately ninety electrical degrees, a second impedance network connected between said second phase winding and ground including second resistance means, and a load device having its input connected between said first and second named resistance means and its output connected to said speed adjusting means.

4. A system for controlling the speed of a rotating member as set forth in claim 3 wherein said first impedance network also includes third resistance means connected in parallel with said reactance means and resistance means and said second impedance network includes reactance means connected in parallel with said second resistance means.

5. A system for producing an alternating current speed error signal comprising an alternator having a first phase winding and a second phase winding, the voltage output of said first phase winding leading that of said second phase winding by ninety electrical degrees and said voltages being substantially identical in magnitude, an impedance network connected between said first phase winding and ground including an inductance device and a potentiometer connected in series wherein the reactance of said branch is substantially greater than the resistance such that the voltage across said potentiometer is substantially constant over a large part of the operating range of said alternator lags the voltage of said first phase winding by approximately ninety electrical degrees, and a resistance device connected in parallel with said inductance device and said potentiometer, a second impedance network connected between said second phase winding and ground including a resistance voltage divider circuit and an inductance device and a resistance device connected in parallel with said voltage divider circuit, and an output transformer having its primary winding connected between said voltage divider circuit and the slider of said potentiometer and its secondary winding connected to a load device.

6. A system for controlling the speed of a rotating member comprising an electrically controlled speed adjusting means for the member, voltage generating means operatively connected to said member producing first and second substantially identical voltages varying in frequency and magnitude with the speed of said member, said first voltage leading said second voltage by approximately ninety electrical degrees, a first impedance network connected to receive said first voltage including an inductor and a potentiometer connected in series wherein the reactance of said branch is substantially greater than the resistance such that the voltage across said potentiometer lags said first voltage by approximately ninety electrical degrees, a second impedance network connected to receive said second voltage including a resistance voltage divider circuit, and an output transformer having its primary winding connected between said voltage divider circuit and the slider of said potentiometer, and its secondary winding connected to said speed adjusting means.

7. A system for controlling the speed of a rotating member as set forth in claim 6 wherein said first impedance network also includes resistance means connected in parallel with said inductor and said potentiometer and said second impedance network includes reactance means connected in parallel with said voltage divider circuit.

8. A system for controlling the speed of a rotating member comprising an electrically controlled speed adjusting means for the member, voltage generating means operatively connected to said member producing first and second substantially identical voltages varying in frequency and magnitude with the speed of said member, said first voltage leading said second voltage by approximately ninety electrical degrees, an impedance network connected to receive said first voltage including reactance means and resistance means wherein said means are of such value that the voltage across said resistance means lags said first voltage by approximately ninety electrical degrees, a second impedance network connected to receive said second voltage including resistance means, and a load device having its input connected between each of said first and second named resistance means and its output connected to said speed adjusting means.

9. A system for controlling the speed of a rotating member comprising an electrically controlled speed adjusting means for the member, voltage generating means operatively connected to said member producing first and second substantially identical voltages varying in frequency and magnitude with the speed of said member, said first voltage leading said second voltage by a substantial number of electrical degrees, an impedance network connected to receive said first voltage including reactance means and resistance means wherein said means are of such value that the voltage across said resistance means lags said first voltage by approximately the same number of electrical degrees as said first voltage leads said second voltage, a second impedance network connected to receive said second voltage including resistance means, and a load device having its input connected between each of said first and second named resistance means and its output connected to said speed adjusting means.

References Cited in the file of this patent
UNITED STATES PATENTS

| | | |
|---|---|---|
| 2,310,511 | Buch et al. | Feb. 9, 1943 |
| 2,604,615 | Peterson | July 22, 1952 |
| 2,772,378 | Farkas | Nov. 27, 1956 |
| 2,775,724 | Clark | Dec. 25, 1956 |
| 2,827,910 | Wells et al. | Mar. 25, 1958 |